(12) United States Patent
Parsons et al.

(10) Patent No.: US 9,346,203 B2
(45) Date of Patent: *May 24, 2016

(54) GOLF CLUB HEADS AND METHODS TO MANUFACTURE GOLF CLUB HEADS

(71) Applicant: Parsons Xtreme Golf, LLC, Scottsdale, AZ (US)

(72) Inventors: Robert R. Parsons, Scottsdale, AZ (US); Michael R. Nicolette, Scottsdale, AZ (US); Bradley D. Schweigert, Anthem, AZ (US)

(73) Assignee: PARSONS XTREME GOLF, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,774

(22) Filed: Feb. 20, 2015

(65) Prior Publication Data

US 2015/0231806 A1 Aug. 20, 2015

Related U.S. Application Data

(60) Continuation of application No. 14/618,479, filed on Feb. 10, 2015, now Pat. No. 9,192,830, and a continuation of application No. 14/618,501, filed on Feb. 10, 2015, which is a continuation of application (Continued)

(51) Int. Cl.
*A63B 53/04* (2015.01)
*A63B 53/06* (2015.01)
*B29C 45/14* (2006.01)
*B29K 75/00* (2006.01)
*B29L 31/52* (2006.01)

(52) U.S. Cl.
CPC ....... *B29C 45/14467* (2013.01); *A63B 53/0475* (2013.01); *A63B 2053/0408* (2013.01); *A63B 2053/0445* (2013.01); *A63B 2053/0454* (2013.01); *A63B 2053/0479* (2013.01); *A63B 2053/0491* (2013.01); *B29K 2075/00* (2013.01); *B29L 2031/5227* (2013.01)

(58) Field of Classification Search
CPC .................. A63B 2053/0408; A63B 53/0475; A63B 2953/0445; A63B 2053/0454; A63B 2053/0491; A63B 2053/0479; B29C 45/14467; B29L 2031/5227; B29K 2075/00
USPC .......................... 473/324–350, 287–292, 256
See application file for complete search history.

(56) References Cited

U.S. PATENT DOCUMENTS

| | | | |
|---|---|---|---|
| D294,617 S | 3/1988 | Perkins | |
| 4,754,977 A | 7/1988 | Sahm | |
| 4,798,383 A * | 1/1989 | Nagasaki | A63B 53/04 473/348 |
| 4,803,023 A * | 2/1989 | Enomoto | A63B 53/04 264/45.4 |

(Continued)

OTHER PUBLICATIONS

U.S. Appl. No. 29/501,006, Nicolette et al., "Golf Club Head," filed Aug. 29, 2014.

(Continued)

*Primary Examiner* — Sebastiano Passaniti (57) ABSTRACT

Embodiments of golf club heads and methods to manufacture golf club heads are generally described herein. In one example, a method may include forming a golf club head having a body portion with a toe portion, a heel portion, a top portion, a sole portion, a back portion, and a front portion with a lace portion. The method may form an interior cavity. Other examples and embodiments may be described and claimed.

20 Claims, 9 Drawing Sheets

Related U.S. Application Data

No. 14/589,277, filed on Jan. 5, 2015, which is a continuation of application No. 14/513,073, filed on Oct. 13, 2014, now Pat. No. 8,961,336, which is a continuation of application No. 14/498,603, filed on Sep. 26, 2014, now Pat. No. 9,199,143, application No. 14/627,774, which is a continuation-in-part of application No. 29/511,482, filed on Dec. 11, 2014, now Pat. No. Des. 748,749, which is a division of application No. 29/501,006, filed on Aug. 29, 2014, now Pat. No. Des. 722,352, application No. 14/627,774, which is a continuation-in-part of application No. 29/514,256, filed on Jan. 9, 2015, now Pat. No. Des. 748,214, which is a continuation-in-part of application No. 29/501,006, filed on Aug. 29, 2014, now Pat. No. Des. 722,352, application No. 14/627,774, which is a continuation-in-part of application No. 29/515,013, filed on Jan. 20, 2015, which is a continuation-in-part of application No. 29/501,006, filed on Aug. 29, 2014, now Pat. No. Des. 722,352, application No. 14/627,774, which is a continuation-in-part of application No. 29/515,381, filed on Jan. 22, 2015, now Pat. No. Des. 726,265, which is a continuation-in-part of application No. 29/506,825, filed on Oct. 21, 2014, now Pat. No. Des. 723,120, application No. 14/627,774, which is a continuation-in-part of application No. 29/512,313, filed on Dec. 18, 2014, now abandoned, which is a division of application No. 29/506,825, filed on Oct. 21, 2014, now Pat. No. Des. 723,120.

(60) Provisional application No. 61/942,515, filed on Feb. 20, 2014, provisional application No. 61/945,560, filed on Feb. 27, 2014, provisional application No. 61/948,839, filed on Mar. 6, 2014, provisional application No. 61/952,470, filed on Mar. 13, 2014, provisional application No. 61/992,555, filed on May 13, 2014, provisional application No. 62/010,836, filed on Jun. 11, 2014, provisional application No. 62/011,859, filed on Jun. 13, 2014, provisional application No. 62/032,770, filed on Aug. 4, 2014, provisional application No. 62/041,538, filed on Aug. 25, 2014.

(56) References Cited

U.S. PATENT DOCUMENTS

| | | | |
|---|---|---|---|
| 4,824,116 A | 4/1989 | Nagamoto et al. | |
| 4,988,104 A | 1/1991 | Shiotani et al. | |
| 5,158,296 A | 10/1992 | Lee | |
| 5,213,328 A | 5/1993 | Long et al. | |
| D336,672 S | 6/1993 | Gorman | |
| 5,385,348 A * | 1/1995 | Wargo | A63B 53/08 473/291 |
| 5,419,560 A | 5/1995 | Bamber | |
| 5,425,535 A | 6/1995 | Gee | |
| 5,447,311 A | 9/1995 | Viollaz et al. | |
| 5,451,056 A | 9/1995 | Manning | |
| D362,884 S | 10/1995 | Blough et al. | |
| D362,885 S | 10/1995 | Blough et al. | |
| D362,887 S | 10/1995 | Blough et al. | |
| D370,514 S | 6/1996 | Blough et al. | |
| 5,540,437 A | 7/1996 | Bamber | |
| 5,637,045 A | 6/1997 | Igarashi | |
| 5,669,830 A | 9/1997 | Bamber | |
| 5,766,091 A | 6/1998 | Humphrey et al. | |
| 5,766,092 A | 6/1998 | Mimeur et al. | |
| 5,827,132 A | 10/1998 | Bamber | |
| D408,485 S | 4/1999 | Takahashi et al. | |
| 5,899,821 A | 5/1999 | Hsu et al. | |
| D421,080 S | 2/2000 | Chen | |
| D426,276 S | 6/2000 | Besnard et al. | |
| 6,077,171 A | 6/2000 | Yoneyama | |
| 6,290,609 B1 | 9/2001 | Takeda | |
| D458,328 S | 6/2002 | Solheim et al. | |
| D469,833 S | 2/2003 | Roberts et al. | |
| D473,605 S | 4/2003 | Petersen et al. | |
| 6,554,722 B2 * | 4/2003 | Erickson | A63B 53/04 473/334 |
| D475,107 S | 5/2003 | Madore | |
| 6,695,714 B1 | 2/2004 | Bliss et al. | |
| 6,702,693 B2 | 3/2004 | Bamber | |
| D492,376 S | 6/2004 | Nicolette et al. | |
| D494,240 S | 8/2004 | Schweigert | |
| D494,648 S | 8/2004 | Schweigert et al. | |
| 6,780,123 B2 | 8/2004 | Hasebe | |
| D497,963 S | 11/2004 | Toulon et al. | |
| 6,811,496 B2 | 11/2004 | Wahl et al. | |
| D500,350 S | 12/2004 | Schweigert et al. | |
| D500,351 S | 12/2004 | Schweigert et al. | |
| D502,237 S | 2/2005 | Schweigert et al. | |
| D502,975 S | 3/2005 | Schweigert et al. | |
| D503,204 S | 3/2005 | Nicolette et al. | |
| D504,925 S | 5/2005 | Schweigert et al. | |
| D505,171 S | 5/2005 | Schweigert et al. | |
| D507,320 S | 7/2005 | Roberts et al. | |
| D507,614 S | 7/2005 | Schweigert et al. | |
| D508,099 S | 8/2005 | Schweigert et al. | |
| D508,545 S | 8/2005 | Roberts et al. | |
| D514,183 S | 1/2006 | Schweigert et al. | |
| D516,650 S | 3/2006 | Wolfe et al. | |
| 7,037,213 B2 * | 5/2006 | Otoguro | A63B 53/04 473/326 |
| D523,501 S | 6/2006 | Nicolette et al. | |
| D523,917 S | 6/2006 | Wolfe et al. | |
| 7,077,763 B2 * | 7/2006 | Wahl | A63B 53/047 473/334 |
| D530,759 S | 10/2006 | Nicolette et al. | |
| D530,760 S | 10/2006 | Schweigert et al. | |
| 7,121,956 B2 | 10/2006 | Lo | |
| 7,128,663 B2 | 10/2006 | Bamber | |
| D532,849 S | 11/2006 | Nicolette et al. | |
| D534,228 S | 12/2006 | Nicolette et al. | |
| D534,595 S | 1/2007 | Hasebe | |
| D534,597 S | 1/2007 | Nicolette et al. | |
| D536,759 S | 2/2007 | Schweigert et al. | |
| D537,494 S | 2/2007 | Jertson et al. | |
| 7,182,698 B2 | 2/2007 | Tseng | |
| D538,366 S | 3/2007 | Nicolette et al. | |
| D539,864 S | 4/2007 | Nicolette et al. | |
| D540,898 S | 4/2007 | Solheim et al. | |
| D541,360 S | 4/2007 | Schweigert et al. | |
| 7,207,900 B2 | 4/2007 | Nicolette et al. | |
| D543,601 S | 5/2007 | Kawami | |
| D544,056 S | 6/2007 | Nicolette et al. | |
| D547,410 S | 7/2007 | Nicolette et al. | |
| D555,219 S | 11/2007 | Lin | |
| 7,303,486 B2 | 12/2007 | Imamoto | |
| D561,855 S | 2/2008 | Schweigert et al. | |
| D562,925 S | 2/2008 | Schweigert et al. | |
| 7,351,164 B2 | 4/2008 | Schweigert et al. | |
| D570,435 S | 6/2008 | Sanchez et al. | |
| D570,935 S | 6/2008 | Nicolette et al. | |
| D570,936 S | 6/2008 | Schweigert et al. | |
| D570,942 S | 6/2008 | Chen et al. | |
| D571,422 S | 6/2008 | Schweigert et al. | |
| D571,425 S | 6/2008 | Chen et al. | |
| D571,427 S | 6/2008 | Schweigert et al. | |
| D571,881 S | 6/2008 | Nicolette et al. | |
| D572,326 S | 7/2008 | Schweigert et al. | |
| D572,329 S | 7/2008 | Nicolette et al. | |
| D573,219 S | 7/2008 | Schweigert et al. | |
| 7,396,299 B2 | 7/2008 | Nicolette et al. | |
| 7,413,518 B2 | 8/2008 | Cole et al. | |
| D577,783 S | 9/2008 | Schweigert et al. | |
| D578,590 S | 10/2008 | Schweigert et al. | |
| D581,000 S | 11/2008 | Nicolette et al. | |
| D581,004 S | 11/2008 | Schweigert et al. | |
| D584,370 S | 1/2009 | Cleveland et al. | |
| D596,256 S | 7/2009 | Schweigert et al. | |

(56) References Cited

U.S. PATENT DOCUMENTS

| | | | |
|---|---|---|---|
| D596,257 S | 7/2009 | Jertson et al. | |
| D596,258 S | 7/2009 | Jertson et al. | |
| D596,688 S | 7/2009 | Schweigert et al. | |
| D597,158 S | 7/2009 | Schweigert et al. | |
| D601,216 S | 9/2009 | Jertson et al. | |
| 7,588,502 B2 | 9/2009 | Nishino | |
| 7,601,075 B2 | 10/2009 | Cole et al. | |
| D604,783 S | 11/2009 | Nicolette et al. | |
| 7,611,424 B2 | 11/2009 | Nagai et al. | |
| 7,632,193 B2 * | 12/2009 | Thielen | A63B 53/0466 473/334 |
| 7,658,686 B2 | 2/2010 | Soracco | |
| D618,293 S | 6/2010 | Foster et al. | |
| 7,736,243 B2 | 6/2010 | Sanchez et al. | |
| 7,744,484 B1 | 6/2010 | Chao | |
| D621,893 S | 8/2010 | Nicolette et al. | |
| D621,894 S | 8/2010 | Schweigert | |
| D621,895 S | 8/2010 | Schweigert et al. | |
| D627,409 S | 11/2010 | Schweigert et al. | |
| D627,410 S | 11/2010 | Nicolette et al. | |
| D635,627 S | 4/2011 | Nicolette | |
| 7,938,738 B2 | 5/2011 | Roach | |
| D642,642 S | 8/2011 | Jertson et al. | |
| D643,491 S | 8/2011 | Stokke et al. | |
| D643,492 S | 8/2011 | Nicolette et al. | |
| D643,896 S | 8/2011 | Jertson et al. | |
| D647,582 S | 10/2011 | Nicolette et al. | |
| D649,211 S | 11/2011 | Jertson et al. | |
| 8,062,150 B2 | 11/2011 | Gilbert et al. | |
| D651,268 S | 12/2011 | Nicolette et al. | |
| 8,088,025 B2 | 1/2012 | Wahl et al. | |
| 8,092,319 B1 | 1/2012 | Cackett et al. | |
| 8,105,180 B1 | 1/2012 | Cackett et al. | |
| 8,142,307 B2 | 3/2012 | Sanchez et al. | |
| 8,221,262 B1 | 7/2012 | Cackett et al. | |
| 8,246,487 B1 | 8/2012 | Cackett et al. | |
| D670,775 S | 11/2012 | Jertson et al. | |
| D672,417 S | 12/2012 | Jertson et al. | |
| D673,633 S | 1/2013 | Jertson et al. | |
| D673,634 S | 1/2013 | Jertson et al. | |
| 8,376,878 B2 | 2/2013 | Bennett et al. | |
| D680,603 S | 4/2013 | Nicolette et al. | |
| D681,142 S | 4/2013 | Fossum et al. | |
| D681,143 S | 4/2013 | Nicolette et al. | |
| 8,414,422 B2 | 4/2013 | Peralta et al. | |
| 8,506,420 B2 | 8/2013 | Hocknell et al. | |
| 8,574,094 B2 | 11/2013 | Nicolette et al. | |
| 8,657,700 B2 | 2/2014 | Nicolette et al. | |
| 8,663,026 B2 | 3/2014 | Blowers et al. | |
| 8,690,710 B2 | 4/2014 | Nicolette et al. | |
| 8,753,230 B2 | 6/2014 | Stokke et al. | |
| D708,688 S | 7/2014 | Nicolette et al. | |
| D722,352 S | 2/2015 | Nicolette et al. | |
| D723,120 S | 2/2015 | Nicolette | |
| 8,961,336 B1 * | 2/2015 | Parsons | A63B 53/0475 473/332 |
| D726,265 S | 4/2015 | Nicolette | |
| 9,192,830 B2 * | 11/2015 | Parsons | A63B 53/0475 |
| 9,199,143 B1 * | 12/2015 | Parsons | A63B 53/0475 |
| 2002/0107087 A1 | 8/2002 | Fagot | |
| 2003/0176231 A1 | 9/2003 | Hasebe | |
| 2004/0204263 A1 | 10/2004 | Fagot et al. | |
| 2005/0009632 A1 | 1/2005 | Schweigert et al. | |
| 2005/0014573 A1 | 1/2005 | Lee | |
| 2005/0096148 A1 | 5/2005 | Noble et al. | |
| 2005/0119066 A1 | 6/2005 | Stites et al. | |
| 2005/0239569 A1 | 10/2005 | Best et al. | |
| 2005/0277485 A1 | 12/2005 | Hou et al. | |
| 2006/0100029 A1 * | 5/2006 | Lo | A63B 53/0466 473/338 |
| 2006/0111200 A1 | 5/2006 | Poynor | |
| 2007/0032308 A1 | 2/2007 | Fagot et al. | |
| 2007/0225084 A1 | 9/2007 | Schweigert et al. | |
| 2008/0058113 A1 | 3/2008 | Nicolette et al. | |
| 2008/0188322 A1 | 8/2008 | Anderson et al. | |
| 2008/0300065 A1 | 12/2008 | Schweigert | |
| 2009/0029790 A1 | 1/2009 | Nicolette et al. | |
| 2010/0130306 A1 | 5/2010 | Schweigert | |
| 2010/0178999 A1 | 7/2010 | Nicolette et al. | |
| 2011/0111883 A1 | 5/2011 | Cackett | |
| 2011/0165963 A1 | 7/2011 | Cackett et al. | |
| 2013/0137532 A1 | 5/2013 | Deshmukh et al. | |
| 2013/0288823 A1 | 10/2013 | Hebreo | |
| 2014/0080621 A1 | 3/2014 | Nicolette et al. | |
| 2014/0128175 A1 | 5/2014 | Jertson et al. | |

OTHER PUBLICATIONS

U.S. Appl. No. 14/498,603, Parsons et al., "Golf Club Heads and Methods to Manufacture Golf Club Heads," filed Sep. 26, 2014.
U.S. Appl. No. 14/513,073, Parsons et al., "Golf Club Heads and Methods to Manufacture Golf Club Heads," filed Oct. 13, 2014.
U.S. Appl. No. 29/506,825, Nicolette, "Golf Club Head," filed Oct. 21, 2014.
U.S. Appl. No. 29/511,482, Nicolette et al., "Golf Club Head," filed Dec. 11, 2014.
U.S. Appl. No. 29/512,313, Nicolette, "Golf Club Head," filed Dec. 18, 2014.
U.S. Appl. No. 14/589,277, Parsons et al., "Golf Club Heads and Methods to Manufacture Golf Club Heads," filed Jan. 5, 2015.
U.S. Appl. No. 29/514,256, Nicolette et al., "Golf Club Head," filed Jan. 9, 2015.
U.S. Appl. No. 29/515,013, Nicolette et al., "Golf Club Head," filed Jan. 20, 2015.
U.S. Appl. No. 29/515,381, Nicolette, "Golf Club Head," filed Jan. 22, 2015.
U.S. Appl. No. 14/618,501, Parsons et al., "Golf Club Heads and Methods to Manufacture Golf Club Heads," filed Feb. 10, 2015.
U.S. Appl. No. 14/618,479, Parsons et al., "Golf Club Heads and Methods to Manufacture Golf Club Heads," filed Feb. 10, 2015.
U.S. Appl. No. 14/627,774, Parsons et al., "Golf Club Heads and Methods to Manufacture Golf Club Heads," filed 20, 2015.
International Search Report and Written Opinion issued in connection with corresponding application No. PCT/US2015/016666, on May 14, 2015 (8 pages).

* cited by examiner

GOLF CLUB HEADS AND METHODS TO MANUFACTURE GOLF CLUB HEADS

CROSS REFERENCE

This application is a continuation application of U.S. Non-Provisional application Ser. No. 14/618,479, filed Feb. 10, 2015, which claims the benefit of U.S. Provisional Application Ser. No. 61/942,515, filed Feb. 20, 2014, U.S. Provisional Application Ser. No. 61/945,560, filed Feb. 27, 2014, U.S. Provisional Application Ser. No. 61/948,839, filed Mar. 6, 2014, U.S. Provisional Application Ser. No. 61/952,470, filed Mar. 13,2014, U.S. Provisional Application Ser. No. 61/992, 555, filed May 13, 2014, U.S. Provisional Application Ser. No. 62/010,836, filed Jun. 11, 2014, U.S. Provisional Application Ser. No. 62/011,859, filed Jun. 13, 2014, and U.S. Provisional Application Ser. No. 62/032,770, filed Aug. 4, 2014. This application is also a continuation application of U.S. Non-Provisional application Ser. No. 14/618,501, filed Feb. 10, 2015, which is a continuation application of U.S. Non-Provisional Application Ser. No. 14/589,277, filed Jan. 5, 2015, which is a continuation application of U.S. Non-Provisional Application Ser. No. 14/513,073, filed Oct. 13, 2024, which is a continuation application of U.S. Non-Provisional application Ser. No. 14/498,603, filed Sep. 26, 2014, which claims the benefit of U.S. Provisional Application No. 62/041,538, filed Aug. 25, 2014. This application is also continuation-in-part application of U.S. application Ser. No. 29/511,482, filed Dec. 11, 2014, which is a divisional application of U.S. application Ser. No. 29/501,006 filed Aug. 29, 2014. This application is also a continuation-in-part application of U.S. application Ser. No. 29/514,256, filed Jan. 9, 2015, which is a continuation-in-part application of U.S. application Ser. No. 29/501,006, filed Aug. 29, 2014. This application is also a continuation-in-part application of U.S. application Ser. No. 29/515,013, filed Jan. 20, 2015, which is a continuation-in-part application of U.S. Ser. No. 29/501, 006, filed Aug. 29, 2014. This application is also, a continuation-in-part application of U.S. application Ser. No. 29/515, 381, filed Jan. 22, 2015, which is a continuation application of U.S. application Ser. No. 29/506,825, filed Oct. 21, 2014. This application is also a continuation-in-part application of U.S. application Ser. No. 29/512,313, filed Dec. 18, 2014, which is a divisional application of U.S. application Ser. No. 29/506,825, filed Oct. 21, 2014. The disclosures of the referenced applications are incorporated herein by reference.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to golf equipment, and more particularly, to golf club heads and methods to manufacturing golf club heads.

BACKGROUND

Various materials (e.g., steel-based materials, titanium-based materials, tungsten-based materials, etc.) may be used to manufacture golf club heads. By using multiple materials to manufacture golf club heads, the position of the center of gravity (CG) and/or the moment of inertia (MOI) of the golf club heads may be optimized to produce certain trajectory and spin rate of a golf ball.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of embodiments of the present disclosure.

DESCRIPTION

In general, golf club heads and methods to manufacture golf club heads are described herein. The apparatus, methods, and articles of manufacture described herein are not limited in this regard.

In the example of FIGS. 1-14, a golf club head 100 may include a body portion 110 (FIG. 14), and two or more weight portions, generally shown as a first set of weight portions 120 (e.g., shown as weight portions 121, 122, 123, and 124) and a second set of weight portions 130 (e.g., shown as weight portions 131, 132, 133, 134, 135, 136, and 137). The body portion 110 may include a toe portion 140, a heel portion 150, a front portion 160, a back portion 170, a top portion 180, and a sole portion 190. The body portion 110 may be made of a first material whereas the first and second sets of weight portions 120 and 130, respectively, may be made of a second material. The first and second materials may be similar or different materials. For example, the body portion 110 may be partially or entirely made of a steel-based material (e.g., 17-4 PH stainless steel, Nitronic® 50 stainless steel, maraging steel or other types of stainless steel), a titanium-based material, an aluminum-based material (e.g., a high-strength aluminum alloy or a composite aluminum alloy coated with a high-strength alloy), any combination thereof, and/or other suitable types of materials. The first and second sets of weight portions 120 and 130, respectively, may be partially or entirely made of a high-density material such as a tungsten-based material or other suitable types of materials. Alternatively, the body portion 110 and/or the first and second sets of weight portions 120 and 130, respectively, may be partially or entirely made of a non-metal material (e.g., composite, plastic, etc.). The apparatus, methods, and articles of manufacture are not limited in this regard.

The golf club head 100 may be an iron-type golf club head (e.g., a 1-iron, a 2-iron, a 3-iron, a 4-iron, a 5-iron, a 6-iron, a 7-iron, an 8-iron, a 9-iron, etc) or a wedge-type golf club head (e.g., a pitching wedge, a lob wedge, a sand wedge, an n-degree wedge such as 44 degrees (°), 48°, 52°, 56°, 60°, etc.). Although FIGS. 1-10 may depict a particular type of club head, the apparatus, methods, and articles of manufacture described herein may be applicable to other types of club heads (e.g., a driver-type club, head, a fairway wood-type club head, a hybrid-type club head, a putter-type club head, etc). The apparatus, methods, and articles of manufacture described herein are not limited in this regard.

The toe portion 140 and the heel portion 150 may be on opposite ends of the body portion 110. The heel portion 150 may include a hosel portion 155 configured to receive a shaft (not shown) with a grip (not shown) on one end and the golf club head 100 on the opposite end of the shaft to form a golf club.

The front portion 160 may include a face portion 162 (e.g., a strike face). The face portion 162 may include a front surface 164 and a back surface 166. The front surface 164 may include one or more grooves 168 extending between the toe portion 140 and the heel portion 150. While the figures may depict a particular number of grooves, the apparatus, methods, and articles of manufacture described herein may include more or less grooves. The face portion 162 may be used to impact a golf ball (not shown). The face portion 162 may be an integral portion of the body portion 110. Alternatively, the face portion 162 may be a separate piece or an insert coupled to the body portion 110 via various manufacturing methods and/or processes (e.g., a bonding process, a welding process, a brazing process, a mechanical locking method, any combination thereof, or other suitable types of manufacturing methods and/or processes). The face portion 162 may be associated with a loft plane that defines the loft angle of the golf club head 100. The loft angle may vary based on the type of golf club (e.g., a long iron, a middle iron, a short iron, a wedge, etc.). In one example, the loft angle may be between five degrees and seventy-five degrees. In another example, the loft angle may be between twenty degrees and sixty degrees. The apparatus, methods, and articles of manufacture described herein are not limited in this regard.

Figure 14:
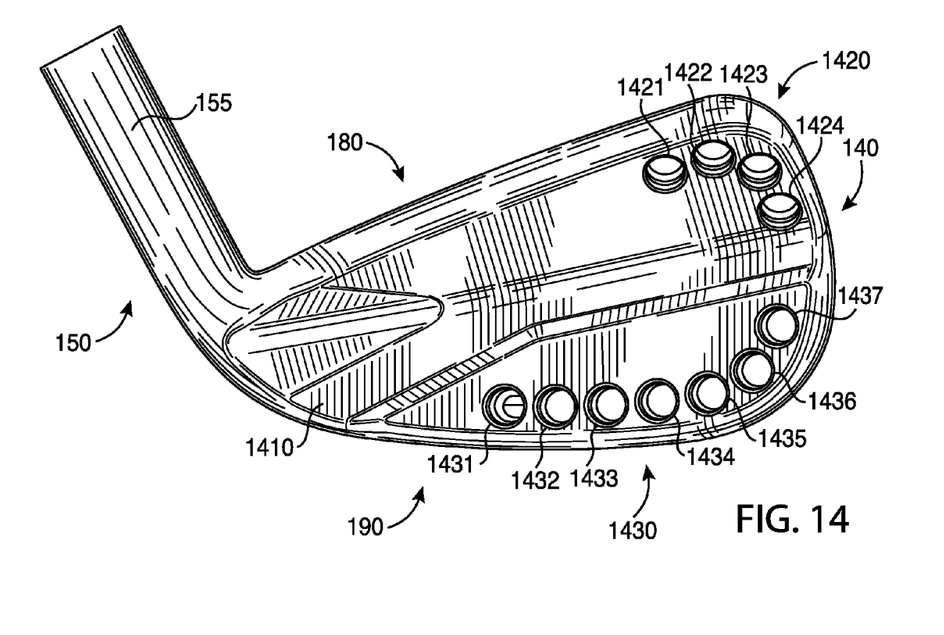
FIG. 14 depicts a rear view of a body portion of the example golf club head of FIG. 1.

As illustrated in FIG. 14, the back portion 170 may include a back wall portion 1410 with one or more exterior weight ports along a periphery of the back portion 170, generally shown as a first set of exterior weight ports 1420 (e.g., shown as weight ports 1421, 1422, 1423, and 1424) and a second set of exterior weight ports 1430 (e.g., shown as weight ports 1431, 1432, 1433, 1434, 1435, 1436, and 1437). Each exterior weight port, may be associated with a port diameter. In one example, the port diameter may be about 0.25 inch (6.35 millimeters). Any two adjacent exterior weight ports of the first set of exterior weight ports 1420 may be separated by less than the port diameter. In a similar manner, any two adjacent exterior weight ports of the second set of exterior weight ports 1430 may be separated by less than the port diameter. The first and second exterior weight ports 1420 and 1430 may be exterior weight ports configured to receive one or more weight portions. In particular, each weight portion of the first set 120 (e.g., shown as weight portions 121, 122, 123, and 124) may be disposed in a weight port located at or proximate to the toe portion 140 and/or the top portion 180 on the back portion 170. For example, the weight portion 121 may be partially or entirely disposed in the weight port 1421. In another example, the weight portion 122 may be disposed in a weight port 1422 located in a transition region between the top portion 180 and the toe portion 140 (e.g., a top-and-toe transition region). Each weight portion of the second set 130 (e.g., shown as weight portions 131, 132, 133, 134, 135, 136, and 137) may be disposed in a weight port located at or proximate to the toe portion 140 and/or the sole portion 190 on the back portion 170. For example, the weight portion 135 may be partially or entirely disposed in the weight port 1435. In another example, the weight portion 136 may be disposed in a weight port 1436 located in a transition region between the sole portion 190 and the toe portion 140 (e.g., a sole-and-toe transition region). As described in detail below, the first and second sets of weight portions 120 and 130, respectively, may be coupled to the back portion 170 of the body portion 110 with various manufacturing methods and/or processes (e.g., a bonding process, a welding process, a brazing process, a mechanical locking method, any combination thereof, or other suitable manufacturing methods and/or processes).

Alternatively, the golf club head 100 may not include (i) the first set of weight portions 120, (ii) the second set of weight portions 130, or (iii) both the first and second sets of weight portions 120 and 130. In particular, the back portion 170 of the body portion 110 may not include weight ports at or proximate to the top portion 170 and/or the sole portion 190. For example, the mass of the first set of weight portions 120 (e.g., 3 grams) and/or the mass of the second set of weight portions. 130 (e.g., 16.8 grams) may be integral part(s) the body portion 110 instead of separate weight portion(s). The apparatus, methods, and articles of manufacture described herein are not limited in this regard.

Figure 11:
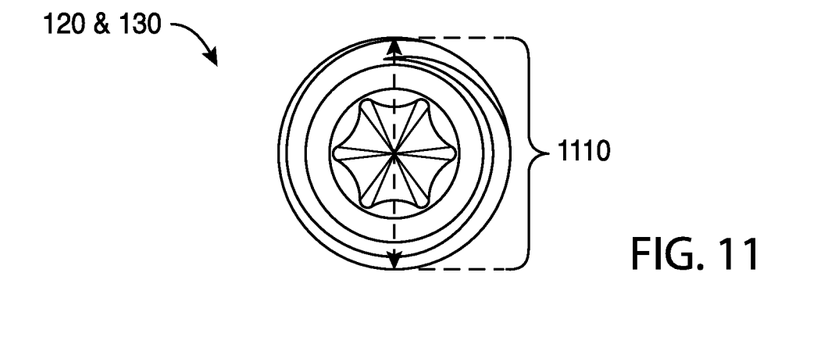
FIG. 11 depicts, atop, view of a weight portion associated with the example golf club head of FIG. 1.

The first and second sets of weight portions 120 and 130, respectively, may have similar or different physical properties (e.g., color, shape, size, density, mass, volume, etc.). As a result, the first and second sets of weight portions 120 and 130, respectively, may contribute to the ornamental design of the golf club head 100. In the illustrated, example as shown in FIG. 11, each of the weight portions of the first and second sets 120 and 130, respectively, may have a cylindrical shape (e.g., a circular cross section). Alternatively, each of the weight portions of the first set 120 may have a first shape (e.g., a cylindrical shape) whereas each of the weight portions of the second set 130 may have a second shape (e.g., a cubical shape). In another example, the first set of weight portions 120 may include two or more weight portions with different shapes (e.g., the weight portion 121 may be a first shape whereas the weight portion 122 may be a second shape different from the first shape). Likewise, the second set of weight portions 130 may also include two or more weight portions with different shapes (e.g., the weight portion 131 may be a first shape whereas the weight portion 132 may be a second shape different from the first shape). Although the above examples may describe weight portions having a particular shape, the apparatus, methods, and articles of manufacture described herein may include weight portions of other suitable shapes (e.g., a portion of or a whole sphere, cube, cone, cylinder, pyramid, cuboidal, prism, frustum, or other suitable geometric-shape). While the above examples and figures may depict multiple weight portions as a set of weight portions, each set of the first and second sets of weight portions 120 and 130, respectively, may be a single piece of weight portion. In one example, the first set of weight portions 120 may be a single piece of weight portion instead of a series of four separate weight portions. In another example, the second set of weight portions 130 may be a single piece of weight portion instead of a series of seven separate weight portions. The apparatus, methods, and articles of manufacture described herein are not limited in this regard.

Figure 12:
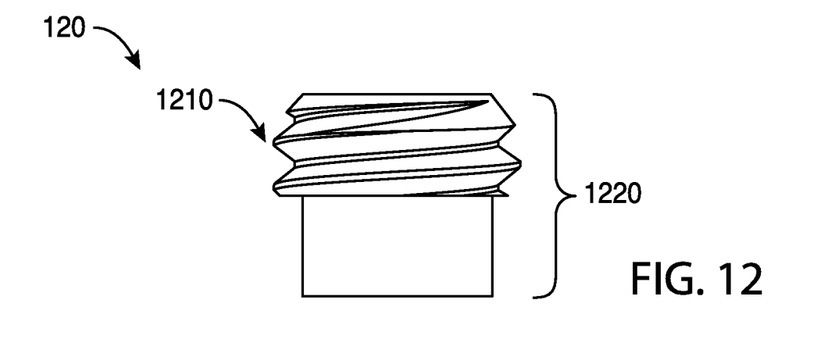
FIG. 12 depicts a side view of a weight portion associated with the example golf club head of FIG. 1.
Figure 13:
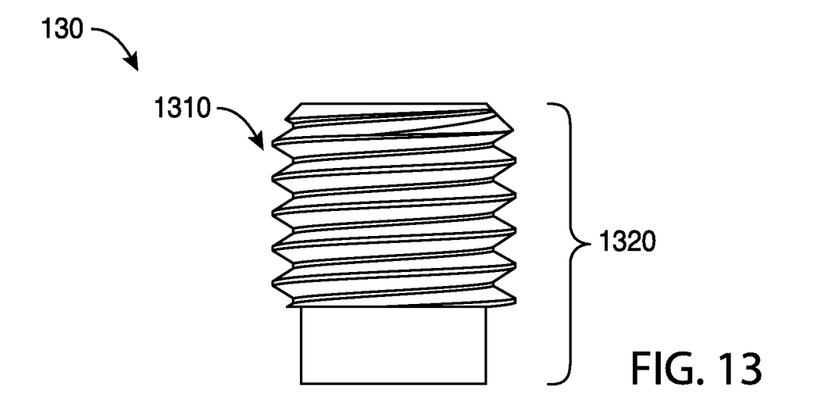
FIG. 13 depicts a side view of another weight portion associated with the example golf club head of FIG. 1.

Referring to FIGS. 12 and 13, for example, the first and second sets of weight portions 120 and 130, respectively, may include threads, generally shown as 1210 and 1310, respectively, to engage with correspondingly configured threads in the weight ports to secure in the weight ports of the back portion 170 (generally shown as 1420 and 1430 in FIG. 14). For example, each weight portion of the first and second sets of weight portions 120 and 130, respectively, may be a screw. The first and second sets of weight portions 120 and 130. respectively, may not be readily removable from the body portion 110 with or without a tool. Alternatively, the first and second sets of weight portions 120 and 130, respectively, may be readily removable (e.g., with a tool) so that a relatively heavier or lighter weight portion may replace one or more of the weight portions of the first and second sets 120 and 130, respectively. In another example, the first and second sets of weight portions 120 and 130, respectively, may be secured in the weight ports of the back portion 170 with epoxy or adhesive so that the first and second sets of weight portions 120 and 130, respectively, may not be readily removable. In yet another example, the first and second sets of weight portions 120 and 130, respectively, may be secured in the weight ports of the back portion 170 with both epoxy and threads so that the first and second sets of weight portions 120 and 130, respectively, may not be readily removable. The apparatus, methods, and articles of manufacture described herein are not limited in this regard.

As mentioned above, the first and second sets of weight portions 120 and 130, respectively, may be similar in some physical properties but different in other physical properties. As illustrated in FIGS. 11-13, for example, each of the weight portions of the first and second sets 120 and 130, respectively, may have a diameter 1110 of about 0.25 inch (6.35 millimeters) but the first and second sets of weight portions 120 and 130, respectively, may be different in height. In particular, each of the weight portions of the first set 120 may be associated with a first height 1220 (FIG. 12), and each of the weight portion of the second set 130 may be associated with a second height 1320 (FIG. 13). The first height 1220 may be relatively shorter than the second height 1320. In one example, the first height 1220 may be about 0.125 inch (3.175 millimeters) whereas the second height 1320 may be about 0.3 inch (7.62 millimeters). In another example, the first height 1220 may be about 0.16 inch (4.064 millimeters) whereas the second height 1320 may be about 0.4 inch (10.16 millimeters). Alternatively, the first height 1220 may be equal to or greater than the second height 1320. The apparatus, methods, and articles of manufacture described herein are not limited in this regard.

Figure 1:
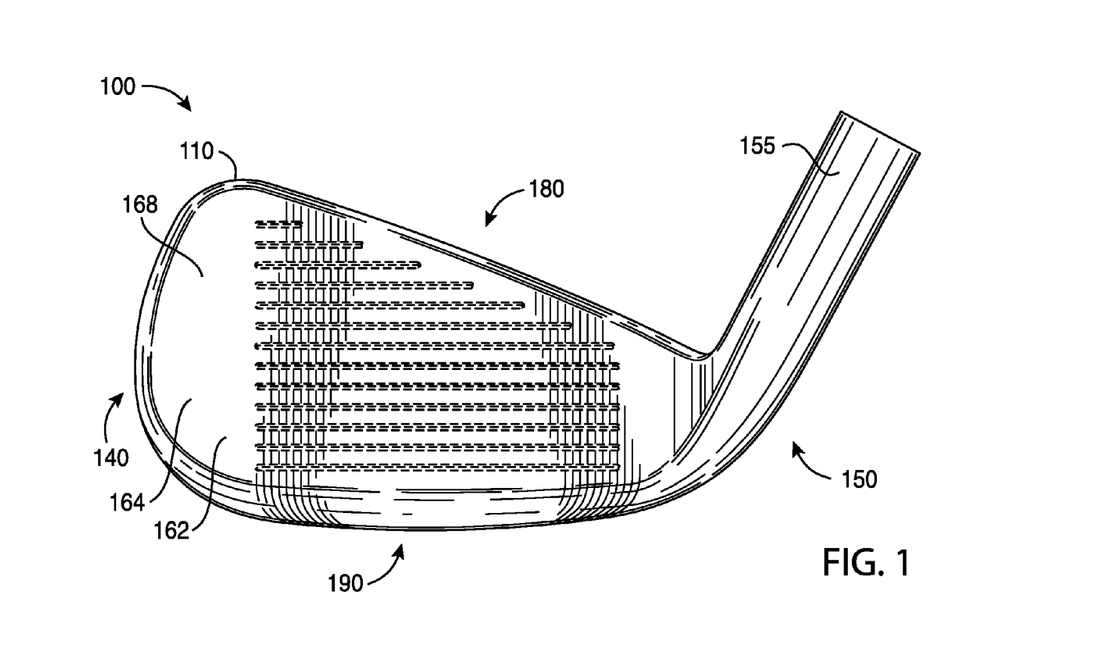
FIG. 1 depicts a front view of a golf club head according to an embodiment of the apparatus, methods, and articles of manufacture described herein.
Figure 2:
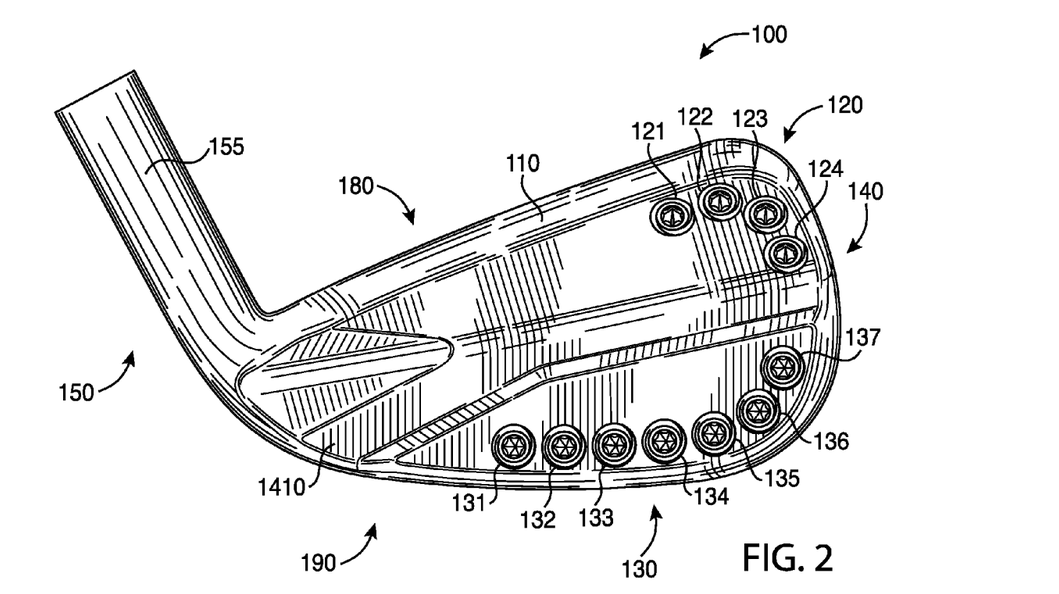
FIG. 2 depicts a rear view of the example golf club head of FIG. 1.
Figure 3:
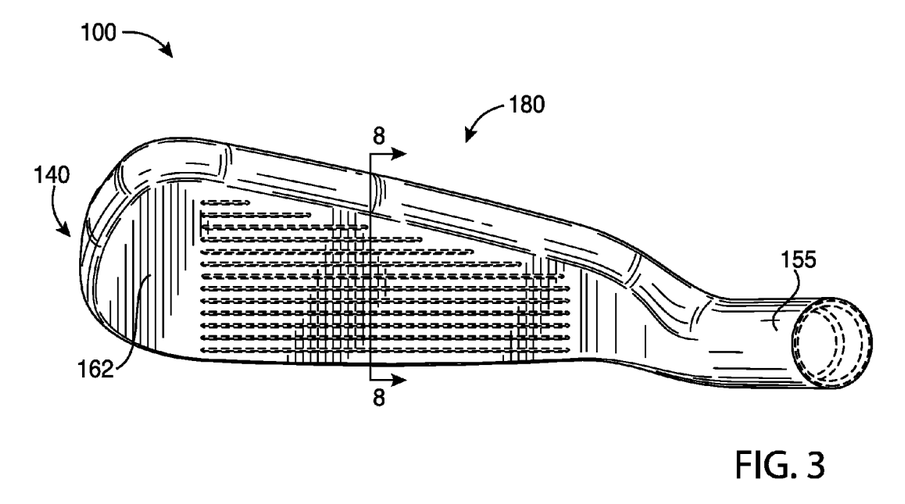
FIG. 3 depicts a top view of the example golf club head of FIG. 1.
Figure 4:
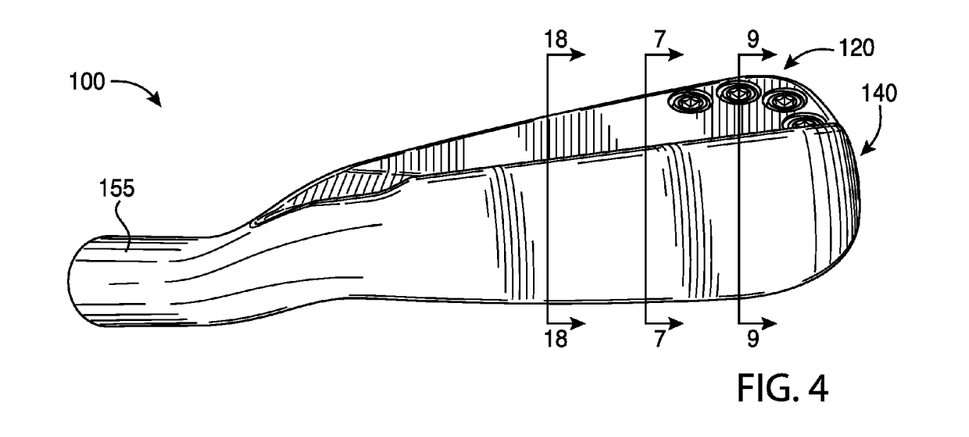
FIG. 4 depicts a bottom view of the example golf club head of FIG. 1.
Figure 5:
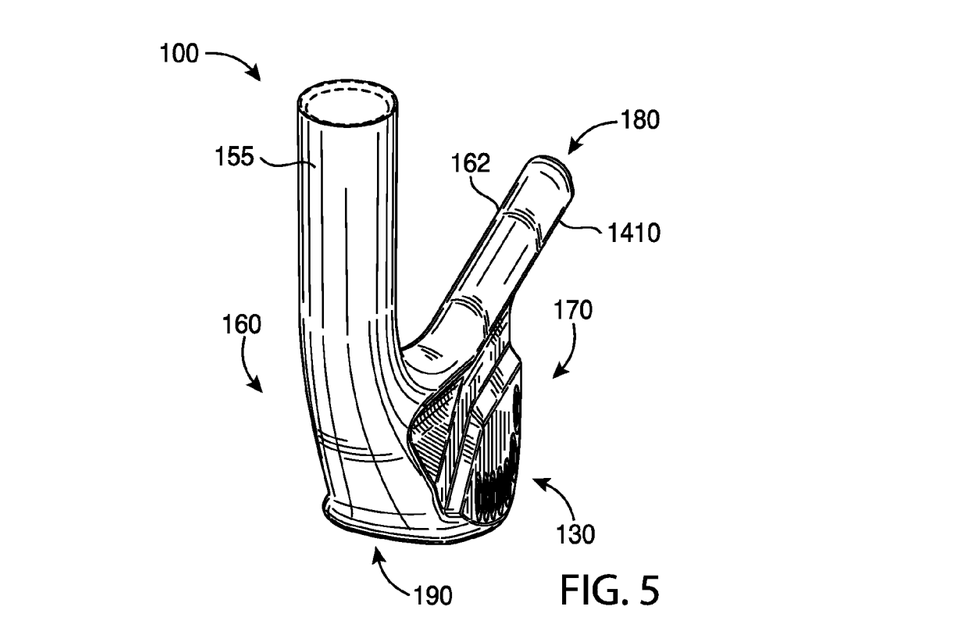
FIG. 5 depicts a left view of the example golf club head of FIG. 1.
Figure 6:
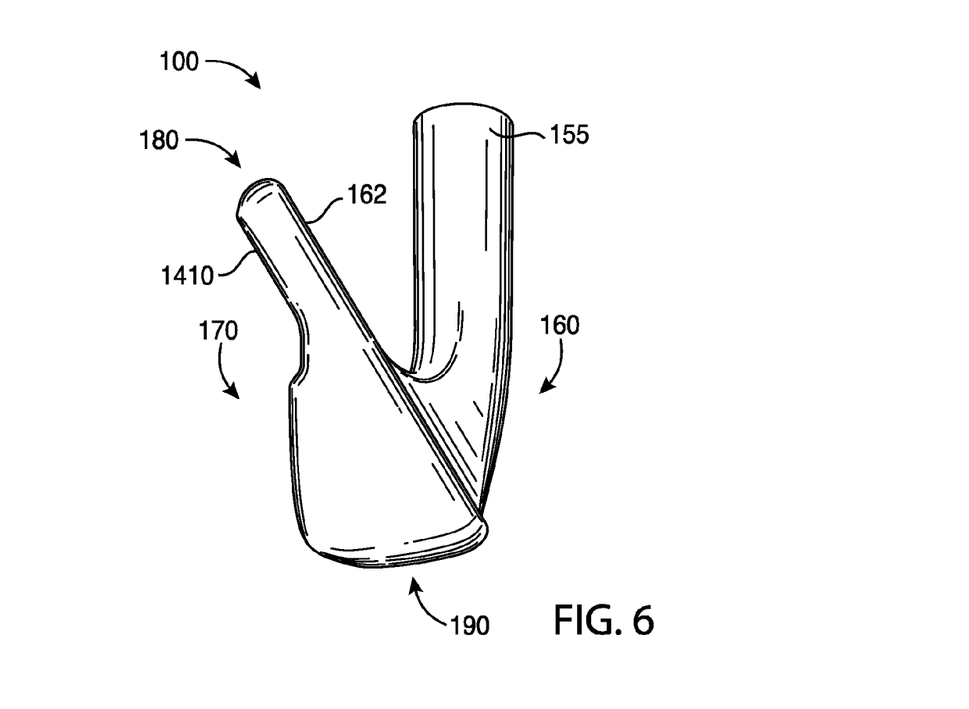
FIG. 6 depicts a right view of the example golf club head of FIG. 1.
Figure 7:
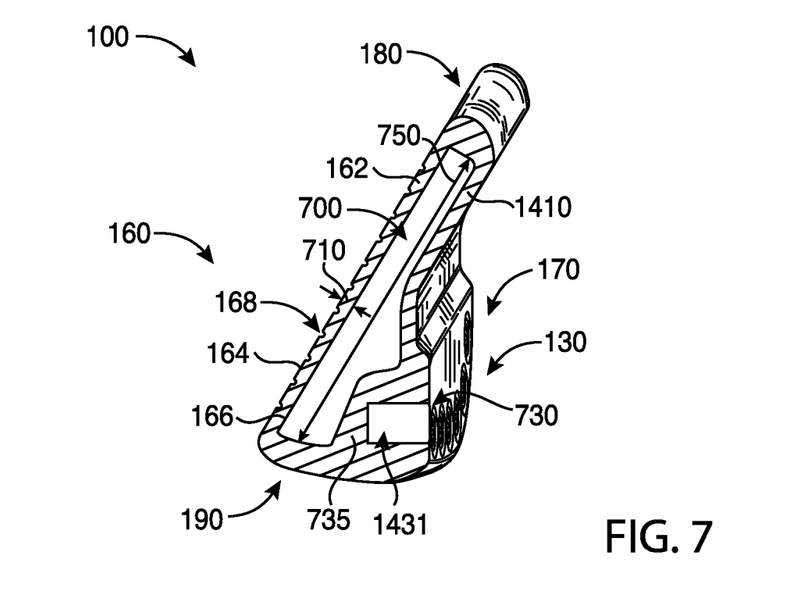
FIG. 7 depicts a cross-sectional view of the example golf club head of FIG. 1 along line 7-7.
Figure 8:
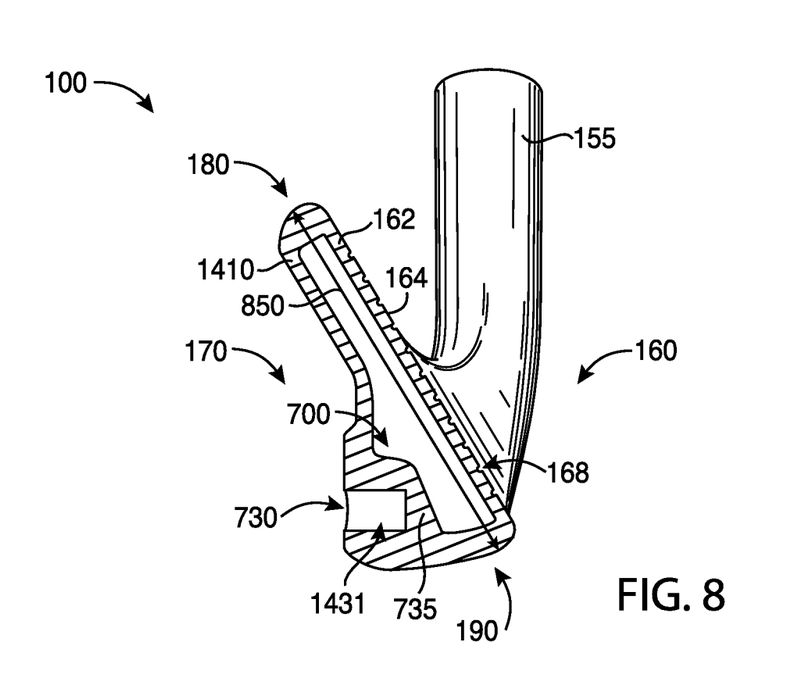
FIG. 8 depicts across-sectional view of the example golf club head of FIG. 1 along line 8-8.
Figure 9:
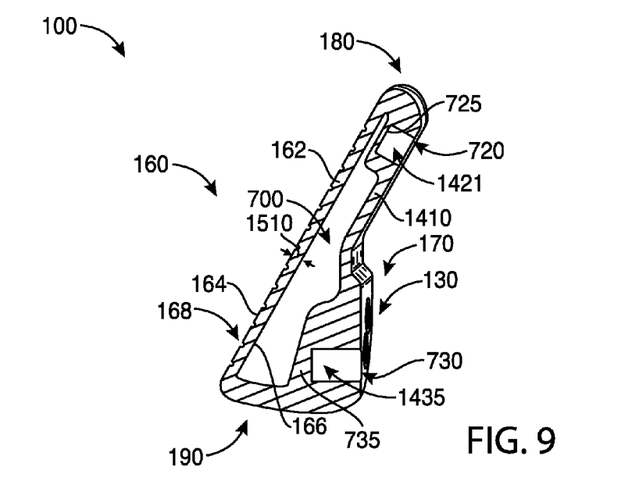
FIG. 9 depicts a cross-sectional view of the example golf club head of FIG. 1 along line 9-9.
Figure 10:
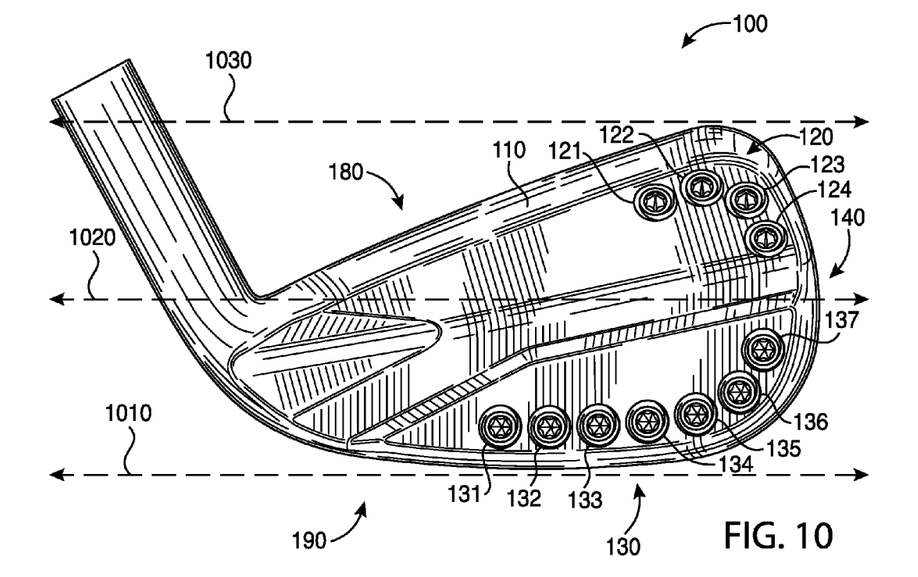
FIG. 10 depicts another rear view of the example golf club head of FIG. 1.

To provide optimal perimeter weighting for the golf club head 100, the first set of weight portions 120 (e.g., weight portions 121, 122, 123, and 124) may be configured to counter-balance the weight of the hosel 155. The second set of weight portions 130 (e.g., weight, portions 131, 132, 133, 134, 135, 136, and 137) may be configured to place the center of gravity of the golf club head 100 at an optimal location. Turning to FIGS. 7-9, for example, the first and second sets of weight portions 120 and 130, respectively, may be located away from the back surface 166 of the face portion 162 (e.g., not directly coupled to each other). That is, the first and second sets of weight portions 120 and 130, respectively, and the back surface 166 may be partially or entirely separated by an interior cavity 700 of the body portion 110. As shown in FIG. 14, for example, each exterior weight port of the first and second sets of exterior weight ports 1420 and 1430 may include an opening (e.g., generally shown as 720 and 730) and a port wall (e.g., generally shown as 725 and 735). The port walls 725 and 735 may be integral portions of the back wall portion 1410 (e.g., a section of the back wall portion 1410). Each of the openings 720 and 730 may be configured to receive a weight portion such as weight portions 121 and 135, respectively. The opening 720 may be located at one end of the weight port 1421, and the port wall 725 may be located or proximate to at an opposite end of the weight port 1421. In a similar manner, the opening 730 may be located at one end of the weight port 1435, and the port wall 735 may be located at or proximate to an opposite end of the weight port 1435. The port walls 725 and 735 may be separated from the face portion 162 (e.g., separated by the interior cavity 700). As a result, the center of gravity (CG) of the golf club head 100 may be relatively farther back away from the face portion 162 and relatively lower towards a ground plane (e.g., one shown as 1010 in FIG. 10) with the second set of weight portions 130 being away from the back surface 166 than if the second set of weight portions 130 were directly coupled to the back surface 166. The apparatus, methods, and articles of manufacture described herein are not limited in this regard.

While the figures may depict weight ports with a particular cross-section shape, the apparatus, methods, and articles of manufacture described, herein may include weight ports with other suitable cross-section shapes. In one example, the weight ports of the first and/or second sets of weight ports 1420 and 1430 may have U-like cross-section shape. In another example, the weight ports of the first and/or second set of weight ports 1420 and 1430 may have V-like cross-section shape. One or more of the weight ports associated with the first set of weight portions 120 may have a different cross-section shape than one or more weight ports associated with the second set of weight portions 130. For example, the weight port 1421 may have a U-like cross-section shape whereas the weight port 1435 may have a V-like cross-section shape. Further, two or more weight ports associated with the first set of weight portions 120 may have different cross-section shapes. In a similar manner, two or more weight ports associated with the second set of weight portions 130 may have different cross-section shapes. The apparatus, methods, and articles of manufacture described herein are not limited in this regard.

Referring back to FIG. 10, for example, the golf club head 100 may be associated with a ground plane 1010, a horizontal midplane 1020, and a top plane 1030. In particular, the ground plane 1010 may be a tangential plane to the sole portion 190 of the golf club head 100 when the golf club head 100 is at an address position (e.g., the golf club head 100 is aligned to strike a golf ball). A top plane 1030 may be a tangential plane to the top portion of the 180 of the golf club head 100 when the golf club head 100 is at the address position. The ground, and top planes 1010 and 1030, respectively, may be substantially parallel to each other. The horizontal midplane 1020 may be vertically halfway between the ground and top planes 1010 and 1030, respectively.

The first and second sets of weight portions 120 and 130, respectively, may be similar in mass (e.g., all of the weight portions of the first and second sets 120 and 130, respectively, weigh about the same). Alternatively, the first and second sets of weight portions 120 and 130, respectively, may be different in mass individually or as an entire set. In particular, each of the weight portions of the first set 120 (e.g., shown as 121, 122, 123, and 124) may have relatively less mass than any of the weight portions of the second set 130 (e.g., shown as 131, 132, 133, 134, 135, 136, and 137). For example, the second set of weight portions 130 may account for more than 50% of the total mass from exterior weight portions of the golf club head 100. As a result, the golf club head 100 may be configured to have at least 50% of the total mass from exterior weight portions disposed below the horizontal midplane 1020. The apparatus, methods, and articles of manufacture described herein are not limited in this regard.

In one example, the golf club head 100 may have a mass in the range of about 220 grams to about 330 grams based on the type of golf club (e.g., a 4-iron versus a lob wedge). The body portion 110 may have a mass in the range of about 200 grams to about 310 grams with the first and second sets of weight portions 120 and 130, respectively, having a mass of about 20 grams (e.g., a total mass from exterior weight portions). Each of the weight portions of the first set 120 may have a mass of about one gram (1.0 g) whereas each of the weight portions of the second set 130 may have a mass of about 2.4 grams. The sum of the mass of the first set of weight portions 120 may be about 3 grams whereas the sum of the mass of the first set of weight portions 130 may be about 16.8 grams. The total mass of the second set of weight portions 130 may weigh more than five times as much as the total mass of the first set of weight portions 120 (e.g., a total mass of the second set of weight portions 130 of about 16.8 grams versus a total mass of the first set of weight portions 120 of about 3 grams). The golf club head 100 may have a total mass of 19.8 grams from the first and second sets of weight portions 120 and 130, respectively (e.g., sum of 3 grams from the first set of weight portions 120 and 16.8 grams from the second set of weight portions 130). Accordingly, the first set of weight portions 120 may account for about 15% of the total mass from exterior weight portions of the golf club head 100 whereas the second set of weight portions 130 may be account for about 85% of the total mass from exterior weight portions of the golf club head 100. The apparatus, methods, and articles of manufacture described herein are not limited in this regard.

By coupling the first and second sets of weight portions 120 and 130, respectively, to the body portion 110 (e.g., securing the first and second sets of weight portions 120 and 130 in the weight ports on the back portion 170), the location of the center of gravity (CG) and the moment of inertia (MOI) of the golf club head 100 may be optimized. In particular, the first and second sets of weight portions 120 and 130, respectively, may lower the location of the CG towards the sole portion 190 and further back away from the face portion 162. Further, the MOI may be higher as measured about a vertical axis extending through the CG (e.g., perpendicular to the ground plane 1010). The MOI may also be higher as measured about a horizontal axis extending through the CG (e.g., extending towards the toe and heel portions 150 and 160, respectively, of the golf club head 100). As a result, the club head 100 may provide a relatively higher launch angle and a relatively lower spin rate than, a golf club head without the first and second sets of weight portions 120 and 130, respectively. The apparatus, methods, and articles of manufacture described herein are not limited in this regard.

Alternatively, two or more weight portions in the same set may be different in mass. In one example, the weight portion 121 of the first set 120 may have a relatively lower mass than the weight portion 122 of the first set 120. In another example, the weight portion 131 of the second set 130 may have a relatively lower mass than the weight portion 135 of the second set 130. With relatively greater mass at the top-and-toe transition region and/or the sole-and-toe transition region, more weight may be distributed away from the center of gravity (CG) of the golf club head 100 to increase the moment of inertia (MOI) about the vertical axis through the CG.

Although the figures may depict the weight portions as separate and individual parts, each set of the first and second sets of weight portions 120 and 130, respectively, may be a single piece of weight portion. In one example, all of the weight portions of the first set 120 (e.g., shown as 121, 122, 123, and 124) may be combined into a single piece of weight portion (e.g., a first weight portion). In a similar manner, all of the weight portions of the second set 130 (e.g., 131, 132, 133, 134, 135, 136, and 137) may be combined into a single piece of weight portion as well (e.g., a second weight portion). In this example, the golf club head 100 may have only two weight portions. While the figures may depict a particular number of weight portions, the apparatus, methods, and articles of manufacture described herein may include more or less number of weight portions. In one example, the first set of weight portions 120 may include two separate weight portions instead of three separate weight portions as shown in the figures. In another example, the second set of weight portions 130 may include five separate weight portions instead of seven separate weight portions a shown in the figures. Alternatively as mentioned above, the apparatus, methods, and articles of manufacture described herein may not include any separate weight portions (e.g., the body portion 110 may be manufactured to include the mass of the separate weight portions as integral part(s) of the body portion 110). The apparatus, methods, and articles of manufacture described herein are not limited in this regard.

Referring back to FIGS. 7-9, for example, the body portion 110 may be a hollow body including the interior cavity 700 extending between the front portion 160 and the back portion 170. Further, the interior cavity 700 may extend between the top portion 180 and the sole portion 190. The interior cavity 700 may be associated with a cavity height 750 ($H_C$), and the body portion 110 may be associated with a body height 850 ($H_B$). While the cavity height 750 and the body height 850 may vary between the toe and heel portions 140 and 150, the cavity height 750 may be at least 50% of a body height 850 ($H_C > 0.5 * H_B$). For example, the cavity height 750 may vary between 70-85% of the body height 850. With the cavity height 750 of the interior cavity 700 being greater than 50% of the body height 850, the golf club head 100 may produce relatively more consistent feel, sound, and/or result when the golf club head 100 strikes a golf ball via the face portion 162 than a golf club head with a cavity height of less than 50% of the body height. The apparatus, methods, and articles of manufacture described herein are not limited in this regard.

In one example, the interior cavity 700 may be unfilled (i.e., empty space). The body portion 100 with the interior cavity 700 may weight about 100 grams less than the body portion 100 without the interior cavity 700. Alternatively, the interior cavity 700 may be partially or entirely filled with an elastic polymer or elastomer material (e.g., a viscoelastic urethane polymer material such as Sorbothane® material manufactured by Sorbothane, Inc., Kent, Ohio), a thermoplastic elastomer material (TPE), a thermoplastic polyurethane material (TPU), and/or other suitable types of materials to absorb shock, isolate vibration, and/or dampen noise. For example, at least 50% of the interior cavity 700 may be filled with a TPE material to absorb shock, isolate vibration, and/or dampen noise when the golf club head 100 strikes a golf ball via the face portion 162. The apparatus, methods, and articles of manufacture described herein are not limited in this regard.

Figure 15:
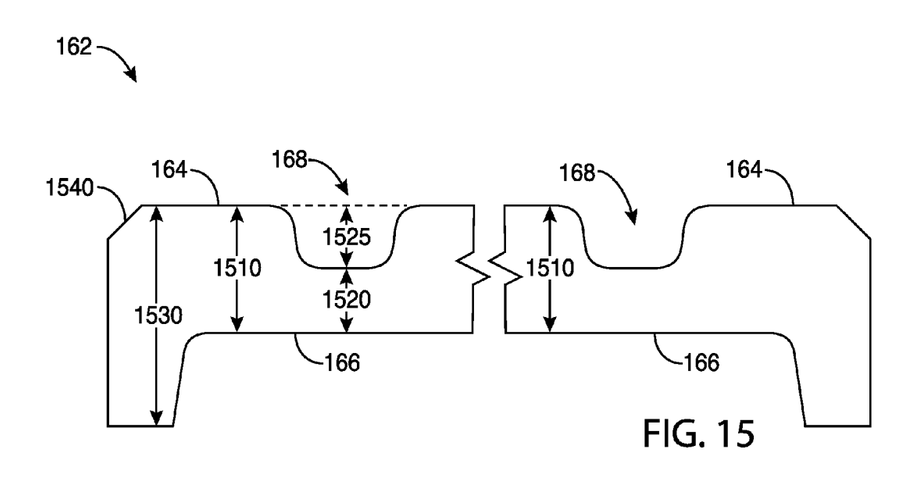
FIG. 15 depicts a cross-sectional view of a face portion of the example golf club head of FIG. 1.

Turning to FIG. 15, for example, the face portion 162 may include a first thickness 1510 ($T_1$), and a second thickness 1520 ($T_2$). The first thickness 1510 may be a thickness of a section of the face portion 162 adjacent to a groove 168 whereas the second thickness 1520 may be a thickness of a section of the face portion 162 below the groove 168. For example, the first thickness 1510 may be a maximum distance between the front surface 164 and the back surface 166. The second thickness 1520 may be based on the groove 168. In particular, the groove 168 may have a groove depth 1525 ($D_{groove}$). The second thickness 1520 may be a maximum distance between the bottom of the groove 168 and the back surface 166. The sum of the second thickness 1520 and the groove depth 1525 may be substantially equal to the first thickness 1510 (e.g., $T_2 + D_{groove} = T_1$). Accordingly, the second thickness 1520 may be less than the first thickness 1510 (e.g., $T_2 < T_1$).

To lower and/or move the CG of the golf club head 100 further back, weight from the front portion 160 of the golf club head 100 may be removed by using a relatively thinner face portion 162. For example, the first thickness 1510 may be about 0.075 inch (1.905 millimeters) (e.g., $T_1 = 0.075$ inch). With the support of the back wait portion 1410 to form the interior cavity 700 and filling at least a portion of the interior cavity 700 with an elastic polymer material, the face portion 162 may be relatively thinner (e.g., $T_1 < 0.075$ inch) without degrading the structural integrity, sound, and/or feel of the golf club head 100. In one example, the first thickness 1510 may be less than or equal to 0.060 inch (1.524 millimeters) (e.g., $T_1 \le 0.060$ inch). In another example, the first thickness 1510 may be less than or equal to 0.040 inch (1.016 millimeters) (e.g., $T_1 \le 0.040$ inch). Based on the type of material(s) used to form the face portion 162 and/or the body portion 110, the face portion 162 may be even thinner with the first thickness 1510 being less than or equal to 0.030 inch (0.762 millimeters) (e.g., $T_1 \le 0.030$ inch). The groove depth 1525 may be greater than or equal to the second thickness 1520 (e.g., $D_{groove} \ge T_2$). In one example, the groove depth 1525 may be about 0.020 inch (0.508 millimeters) (e.g., $D_{groove} = 0.020$ inch). Accordingly, the second thickness 1520 may be about 0.010 inch (0.254 millimeters) (e.g., $T_2 = 0.010$ inch). In another example, the groove depth 1525 may be about 0.015 inch (0.381 millimeters), and the second thickness 1520 may be about 0.015 inch (e.g., $D_{groove} = T_2 = 0.015$ inch). Alternatively, the groove depth 1525 may be less than the second thickness 1520 (e.g., $D_{groove} < T_2$). Without the support of the back wall portion 1410 and the elastic polymer material to fill in the interior cavity 700, a golf club head may not be able to withstand multiple impacts by a golf ball on a face portion. In contrast to the golf club head 100 as described herein, a golf club head with a relatively thin face portion but without the support of the back wall portion 1410 and the elastic polymer material to fill in the interior cavity 700 (e.g., a cavity-back golf club head) may produce unpleasant sound (e.g., a tinny sound) and/or feel during impact with a golf ball. The apparatus, methods, and articles of manufacture described herein are not limited in this regard.

Based on manufacturing processes and methods used to form the golf club head 100, the face portion 162 may include additional material at or proximate to a periphery of the face portion 162. Accordingly, the face portion 162 may also include a third thickness 1530, and a chamfer portion 1540. The third thickness 1530 may be greater than either the first thickness 1510 or the second thickness 1520 (e.g., $T_3 > T_1 > T_2$). In particular, the face portion 162 may be coupled to the body portion 110 by a welding process. For example, the first thickness 1510 may be about 0.030 inch (0.762 millimeters), the second thickness 1520 may be about 0.015 inch (0.381 millimeters), and the third thickness may be about 0.050 inch (1.27 millimeters). Accordingly, the chamfer portion 1540 may accommodate some of the additional material when the face portion 162 is welded to the body portion 110.

Figure 16:
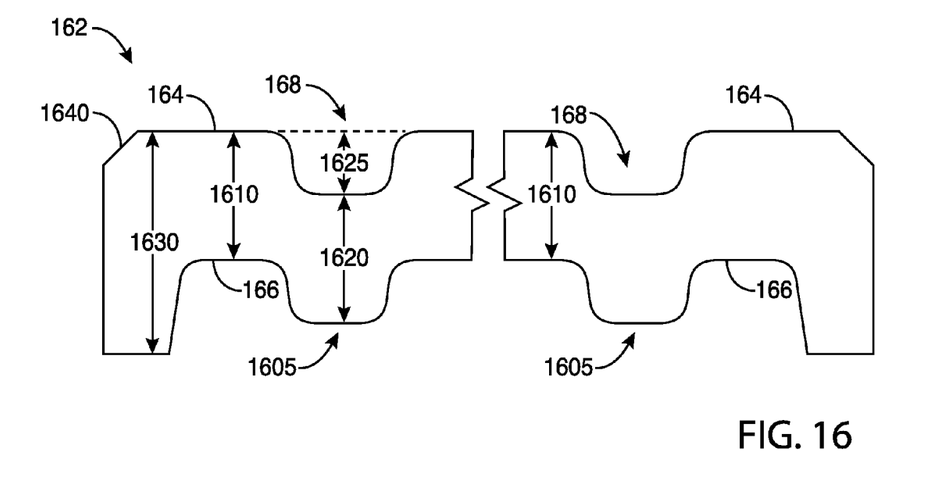
FIG. 16 depicts a cross-sectional view of another face portion of the example golf club head of FIG. 1.

As illustrated in FIG. 16, for example, the face portion 162 may include a reinforcement section, generally shown as 1605, below one or more grooves 168. In one example, the face portion 162 may include a reinforcement section 1605 below each groove. Alternatively, face portion 162 may include the reinforcement section 1605 below some grooves (e.g., every other groove) or below only one groove. The face portion 162 may include a first thickness 1610, a second thickness 1620, a third thickness 1630, and a chamfer portion 1640. The groove 168 may have a groove depth 1625. The reinforcement section 168 may define the second thickness 1620. The first and second thicknesses 1610 and 1620, respectively, may be substantially equal to each other (e.g., $T_1 = T_2$). In one example, the first and second thicknesses 1610 and 1620, respectively, may be about 0.030 inch (0.762 millimeters) (e.g., $T_1 = T_2 = 0.030$ inch). The groove depth 1625 may be about 0.015 inch (0.381 millimeters), and the third thickness 1630 may be about 0.050 inch (1.27 millimeters). The groove 168 may also have a groove width. The width of the reinforcement section 1605 may be greater than or equal to the groove width. The apparatus, methods, and articles of manufacture described herein are not limited in this regard.

Alternatively, the face portion 162 may vary in thickness at and/of between the top portion 180 and the sole portion 190. In one example, the face portion 162 may be relatively thicker at or proximate to the top portion 180 than at or proximate to the sole portion. 190 (e.g., thickness of the face portion 162 may taper from the top portion 180 towards the sole portion 190). In another example, the face portion 162 may be relatively thicker at or proximate to the sole portion 190 than at or proximate to the top portion 180 (e.g., thickness of the face portion 162 may taper front the sole portion 190 towards the top portion 180). In yet another example, the face portion 162 may be relatively thicker between the top portion 180 and the sole portion 190 than at or proximate to the top portion 180 and the sole portion 190 (e.g., thickness of the face portion 162 may have a bell-shaped contour). The apparatus, methods, and articles of manufacture described herein are not limited in this regard.

Different from other golf club head designs, the interior cavity 700 of the body portion 110 and the location of the first and second sets of weight portions 120 and 130, respectively, along the perimeter of the golf club head 100 may result in a golf ball traveling away from the face portion 162 at a relatively higher ball launch angle and a relatively lower spin rate. As a result, the golf ball may travel farther (i.e., greater total distance, which includes carry and roll distances).

Figure 17:
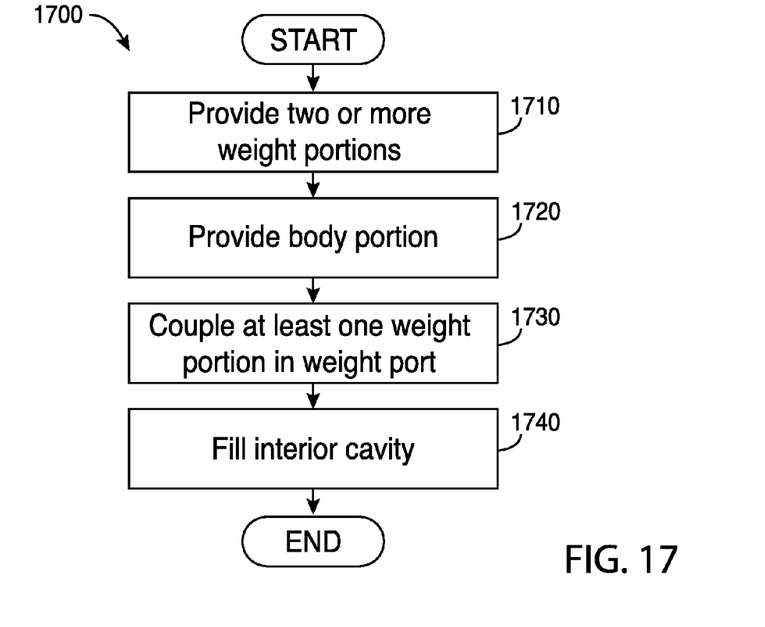
FIG. 17 depicts one manner in which the example golf club head described herein may be manufactured.

FIG. 17 depicts one manner in which the example golf club head described herein may be manufactured. In the example of FIG. 17, the process 1700 may begin with providing two or more weight portions, generally shown as the first and second sets of weight portions 120 and 130, respectively (block 1710). The first and second sets of weight portions 120 and 130, respectively, may be made of a first material such as a tungsten-based material. In one example, the weight portions of the first and second sets 120 and 130, respectively, may be tungsten-alloy screws.

The process 1700 may provide a body portion 110 having the face portion 162, the interior cavity 700, and the back portion 170 with two or more exterior weight ports, generally shown as 1420 and 1430 (block 1720). The body portion 110 may be made of a second material, which is different than the first material. The body portion 110 may be manufacture using an investment casting process, a billet forging process, a stamping process, a computer numerically controlled (CNC) machining process, a die casting process, any combination thereof, or other suitable manufacturing processes. In one example, the body portion 110 may be made of 17-4 PH stainless steel using a casting process. In another example, the body portion 110 may be made of other suitable type of stainless steel (e.g., Nitronic® 50 stainless steel manufactured by AK Steel Corporation, West Chester, Ohio) using a forging process. By using Nitronic® 50 stainless steel to manufacture the body portion 110, the golf club head 100 may be relatively stronger and/or more resistant to corrosion than golf club heads made from other types of steel. Each weight port of the body portion 110 may include an opening and a port wall. For example, the weight port 1421 may include the opening 720 and the port wall 725 with the opening 720 and the port wall 725 being on opposite ends of each other. The interior cavity 700 may separate the port wall 725 of the weight port 1421 and the back surface 166 of the face portion 162. In a similar manner, the weight port 1835 may include the opening 730 and the port wall 735 with the opening 730 and the port wall 735 being on opposite ends of each other. The interior cavity 700 may separate the port wall 735 of the weight port 1435 and the back surface 166 of the face portion 162.

The process 1700 may couple each of the first and second sets of weight portions 120 and 130 into one of the two or more exterior weight ports (blocks 1730). In one example, the process 1700 may insert and secure the weight portion 121 in the exterior weight port 1421, and the weight portion 135 in the-exterior weight portion 1435. The process 1700 may use various manufacturing methods and/or processes to secure the first and second sets of weight portions 120 and 130, respectively, in the exterior weigh ports such as the weight ports 1421 and 1435 (e.g., epoxy, welding, brazing, mechanical lock(s), any combination thereof, etc.).

Figure 18:
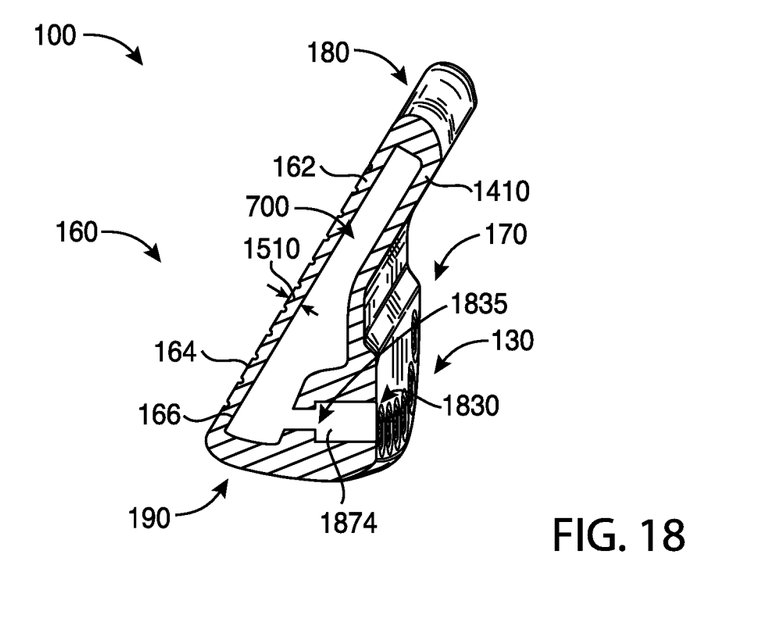
FIG. 18 depicts another cross-sectional view of the example golf club head of FIG. 4 along line 18-18.

The process 1700 may partially or entirely fill the interior cavity 700 with an elastic polymer material (e.g., Sorbothane® material) (block 1740). In one example, at least 50% of the interior cavity 700 may be filled with the elastic polymer material. As mentioned above, the elastic polymer material may absorb shock, isolate vibration, and/or dampen noise in response to the golf club head 100 striking a golf ball. In addition or alternatively, the interior cavity 700 may be filled with a thermoplastic elastomer material and/or a thermoplastic polyurethane material. As illustrated in FIG. 18, for example, the golf club head 100 may include one or more weight ports (e.g., one shown as 1431 in FIG. 14) with a first opening 1830 and a second opening 1835. The second opening 1835 may be used to access the interior cavity 700. In one example, the process 1700 (FIG. 17) may fill the interior cavity 700 with an elastic polymer material by injecting the elastic polymer material into the interior cavity 700 from the first opening 1830 via the second opening 1835. The first and second openings 1830 and 1835, respectively, may be same or different in size and/or of shape. While the above example may describe and depict a particular weight port with a second opening, any other weight ports of the golf club head 100 may include a second opening (e.g., the weight port 720). The apparatus, methods, and articles of manufacture described herein are not limited in this regard.

Referring back to FIG. 17, the example process 1700 is merely provided and described in conjunction with other figures as an example of one way to manufacture the golf club head 100. While a particular order of actions is illustrated in FIG. 17, these actions may be performed in other temporal sequences. For example, two or more actions depicted in FIG. 17 may be performed sequentially, concurrently, or simultaneously. In one example, blocks 1710, 1720, 1730, and/or 1740 may be performed simultaneously or concurrently. Although FIG. 17 depicts a particular number of blocks, the process may not perform one or more blocks. In one example, the interior cavity 700 may not be filled (i.e., block 1740 may not be performed). The apparatus, methods, and articles of manufacture described herein are not limited in this regard.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclose alternative embodiments.

As the rules of golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or nonconforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:
1. A method comprising:
forming a plurality of weight portions made of a first material;
forming a body portion of a golf club head made of a second material, the body portion having a toe portion, a top portion, a sole portion, a back portion, a front portion, an interior cavity extending between the top and sole portions and between the front and back portions, and an exterior port connected to the interior cavity;
forming a plurality of exterior weight ports on the back portion of the body portion, each of the exterior weight ports being associated with a port diameter and config- ured to receive at least one weight portion of the plurality of weight portions, the plurality of exterior weight ports having:
  a first set of exterior weight ports formed along the periphery of the back portion at or proximate to at least one of the top portion or the toe portion, and
  a second set of exterior weight ports formed along the periphery of the back portion at or proximate to at least one of the sole portion or the toe portion,
  wherein any two adjacent exterior weight ports of the first set of exterior weight ports are separated by less than the port diameter, and any two adjacent exterior weight ports of the second set of exterior weight ports are separated by less than the port diameter; and
  injecting an elastic polymer material into the interior cavity from the exterior port.

2. A method as defined in claim 1, wherein injecting the elastic polymer material into the interior cavity comprises filling at least 50% of the interior cavity with the elastic polymer material.

3. A method as defined in claim 1, wherein injecting the elastic polymer material into the interior cavity comprises injecting at least one of a thermoplastic elastomer material or a thermoplastic polyurethane material into the interior cavity from the exterior port.

4. A method as defined in claim 1, wherein forming the body portion comprises forming a body portion having a face portion with a thickness of less than or equal to 0.075 inch.

5. A method as defined in claim 1, wherein forming the body portion comprises forming a body portion having a face portion with a thickness of less than or equal to 0.030 inch.

6. A method as defined in claim 1, wherein forming the body portion comprises forming a body portion having a body height and an interior cavity with a cavity height of at least 50% of the body height.

7. A method as defined in claim 1 further comprising coupling a weight portion into the exterior port.

8. A method as defined in claim 1, wherein forming the body portion comprises forming a body portion having a face portion with a loft angle between five degrees and seventy-five degrees.

9. A method comprising:
  forming two or more weight portions;
  forming a hollow body portion of a golf club head, the body portion having a toe portion, a top portion, a sole portion, a back portion, a front portion, and an interior cavity extending between the top and sole portions and between the front and back portions;
  forming a plurality of exterior ports on the back portion, at least one exterior port of the plurality of exterior ports being connected to the interior cavity, each of the exterior ports being associated with a port diameter and configured to receive at least one weight portion of the plurality of weight portions, the plurality of exterior ports having:
    a first set of exterior ports formed along the periphery of the back portion at or proximate to at least one of the top portion or the toe portion, and
    a second set of exterior ports formed along the periphery of the back portion at or proximate to at least one of the sole portion or the toe portion,
    wherein any two adjacent exterior ports of the first set of exterior ports are separated by less than the port diameter, and any two adjacent exterior ports of the second set of exterior ports are separated by less than the port diameter; and
  injecting an elastic polymer material into the interior cavity from the at least one exterior port.

10. A method as defined in claim 9 further comprising coupling at least one weight portion of the plurality of weight portions into an exterior port of the plurality of exterior ports.

11. A method as defined in claim 9, wherein injecting the elastic polymer material into the interior cavity comprises filling at least 50% of the interior cavity with the elastic polymer material.

12. A method as defined in claim 9, wherein injecting the elastic polymer material into the interior cavity comprises injecting at least one of a thermoplastic elastomer material or a thermoplastic polyurethane material into the interior cavity from the at least one exterior port.

13. A method as defined in claim 9, wherein forming the body portion comprises forming a body portion having a face portion with a thickness of less than or equal to 0.075 inch.

14. A method as defined in claim 9, wherein forming the body portion comprises forming a body portion having a body height and an interior cavity with a cavity height of at least 50% of the body height.

15. A method comprising:
  forming a hollow body portion of a golf club head, the hollow body portion having a toe portion, a top portion, a sole portion, a back portion, and a front portion having a face portion;
  a first set of weight portions coupled to the hollow body portion at or proximate to a top-and-toe transition region between the top portion and the toe portion, the first set of weight portions being associated with a first total mass;
  a second set of weight portions coupled to the hollow body portion at or proximate to a sole-and-toe transition region between the sole portion and the toe portion, the second set of weight portions being associated with a second total mass and located below a horizontal midplane of the golf club head, wherein the first total mass is less than the second total mass; and
  forming an interior cavity comprising an elastic polymer material between the front portion and the back portion, the elastic polymer material being configured to at least partially absorb impact on the face portion.

16. A method as defined in claim 15, wherein forming the interior cavity comprises injecting the elastic polymer material into the interior cavity from an exterior port of the body portion.

17. A method as defined in claim 15, wherein forming the interior cavity comprises injecting at least 50% of the interior cavity with the elastic polymer material.

18. A method as defined in claim 15, wherein forming the interior cavity comprises injecting at least one of a thermoplastic elastomer material or a thermoplastic polyurethane material into the interior cavity.

19. A method as defined in claim 15, wherein forming the body portion comprises forming a body portion having a face portion with a thickness of less than or equal to 0.075 inch.

20. A method as defined in claim 15, wherein forming the interior cavity comprises forming an interior cavity with a cavity height of at least 50% of a body height of the body portion.

* * * * *